June 26, 1928.
E. P. LAMB
1,674,906
LOCK
Filed Sept. 12, 1925
2 Sheets-Sheet 2
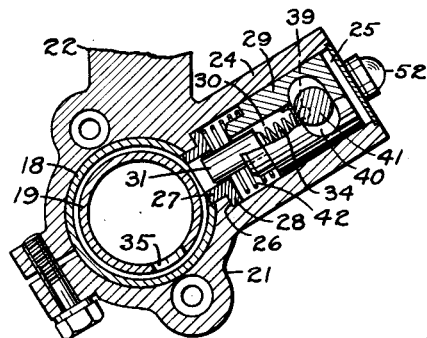
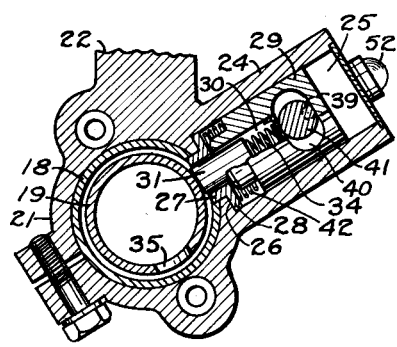
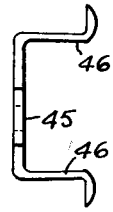
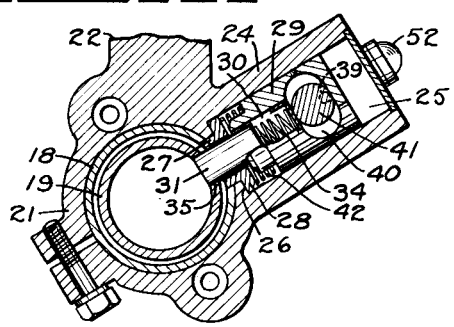
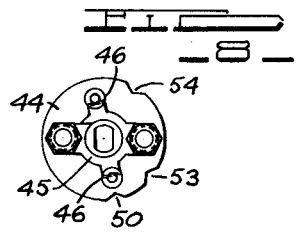
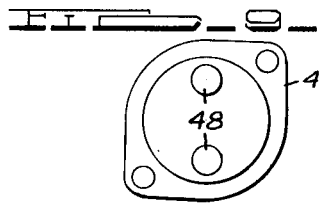
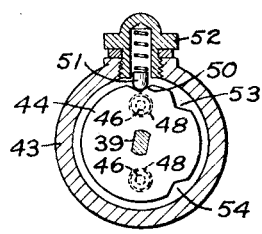
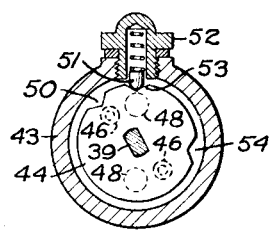
INVENTOR
ERNEST P. LAMB
BY
ATTORNEY Patented June 26, 1928.

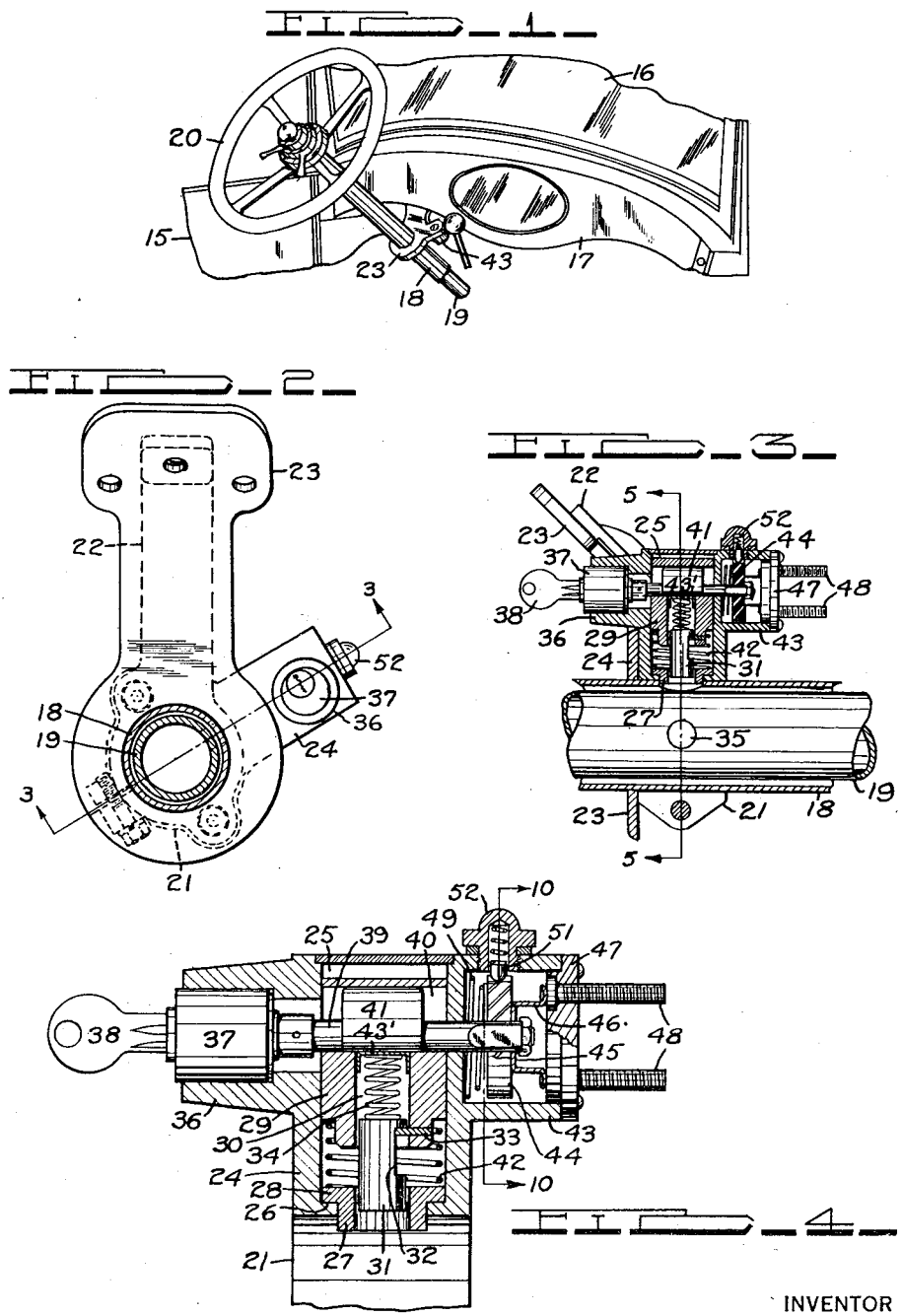

1,674,906

UNITED STATES PATENT OFFICE.

ERNEST P. LAMB, OF DETROIT, MICHIGAN, ASSIGNOR TO THE STUDEBAKER CORPORATION, OF SOUTH BEND, INDIANA, A CORPORATION OF NEW JERSEY.

LOCK.

Application filed September 12, 1925. Serial No. 56,003.

This invention relates to anti-theft devices for motor vehicles and more particularly to means for locking the steering post thereof against unauthorized movement.

The principal object is to provide a steering column lock of simplified construction, and incidently to preferably incorporate therewith means for controlling the ignition circuit of the vehicle engine which is controllable by the same means that controls the lock.

Another object is to provide a steering column lock having an axially movable plunger mechanism movable into engagement with the steering post by means of a key controlled cam member.

Another object is to provide a steering column lock with a plunger member having an elongated transverse slot in the body thereof, which slot receives therein a key controlled cam for causing positive axial movement of the plunger upon rotation of the lock key.

A further object is to provide a switch for the engine ignition which is operatively connected to the plunger cam so as to be movable simultaneously therewith.

The above being among the objects of the present invention, the same consists of certain features of construction and combination of parts to be hereinafter described with reference to the accompanying drawings and then claimed, having the above and other objects in view.

In the accompanying drawings in which like numerals refer to like parts throughout the several different views, Figure 1 is a perspective view of that part of a motor vehicle, including an instrument board and a steering column, showing the position of a lock embodying the present invention which is adapted to serve as the support for the steering column at the instrument board.

Figure 2 is a face view of the assembled lock, the steering post and jacket being shown in section in connection therewith.

Figure 3 is a fragmentary sectional view taken on the line 3—3 of Figure 2.

Figure 4 is an enlarged partially broken view taken on the same line as Figure 3 showing the locking and ignition switch mechanism in greater detail.

Figure 5 is a sectional view taken on the line 5—5 of Figure 3, showing the mechanism in unlocked position with the steering column free to rotate.

Figure 6 is a view corresponding to Figure 5 but with the mechanism in locked position, illustrating the action of the plunger mechanism when the upper or auxiliary plunger is placed in locked position and the lower or main plunger is not engaged in the opening in the steering column.

Figure 7 is a view corresponding to Figure 6, but showing the position of the lower or main plunger when the opening provided to receive it in the steering column is brought into matching relation therewith.

Figure 8 is a view of the rotatable switch member used in the ignition switch as viewed from the rear, or right of Figure 4.

Figure 9 is a face view from the forward side of the stationary switch lock or cap member which closes the opening in which the switch is located.

Figure 10 is a sectional view of the switch mechanism taken as on the line 10—10 of Figure 4, the switch being shown in closed circuit position which it assumes in one position when the steering column is unlocked.

Figure 11 is a view corresponding to Figure 10 but showing the rotatable switch member rotated from the position illustrated in Figure 10 to a position in which the ignition circuit is broken but the steering cloumn is not locked against rotation.

Figure 12 is a view corresponding to Figure 10 but showing the rotatable switch member rotated to a position in which the ignition circuit is broken and the steering column is locked.

Figure 13 is an enlarged side view of the contact member which is carried by the rotatable switch member.

In the drawings, the relative position of the lock embodying the present invention with respect to a motor vehicle is illustrated in Figure 1 which shows a portion of a motor vehicle including a body 15, a windshield 16, an instrument board 17, and a steering post 19 terminating at its upper end in the usual steering wheel 20 and various other control devices.

The steering column lock comprises a casing 21 which surrounds the jacket 18 on the steering post 19 and is provided with an extending arm or flange 22 which extends upwardly and back of the instrument board 17 and is secured thereto to provide an additional support for the steering column and to prevent relative turning movement of the lock. The casing 21 and flange 22 thereon are provided with a face plate or member 23 which overlies the exposed faces of the same for the purpose of giving a finished appearance to the lock.

The casing 21 is provided with an angularly extending boss portion 24 which houses the greater portion of the locking mechanism, this boss being provided for greater ease of operation of the lock than would be possible were it incorporated in the arm 22 which lies on the opposite side of the steering column from the operator of the vehicle and hence is less accessible. The boss portion 24 is provided with an opening 25 therethrough, the axis of which is radial to the steering post 19, the opening 25 extending at full diameter from the end remote from the post 19 to a point adjacent the jacket 18 at which point it is reduced in diameter to form an annular shoulder 26 (see Figure 4) and then continues on to the jacket 18 which is provided with a matching opening. A collar 27, the outside diameter of which is closely but slidably received in the reduced portion of the opening 25 is inserted from the outer end of the opening 25 and is provided with an outwardly extending annular flange 28 which seats against the shoulder 26 and which is located thereby, the opposite end of the collar 27 projecting down into the jacket 18 to thereby prevent relative turning between the casing 21 and jacket 18 and to prevent any possibility of the locking plunger from binding against the jacket 18.

Slidably received in the opening 25 is the auxiliary locking plunger 29 which is provided with an axial opening 30 opening towards the steering post 19 and in which is slidably received the main locking plunger 31 which extends outwardly or towards the steering post 19 therefrom and is loosely guided in the collar 27. The main plunger 31 is provided with an elongated notch 32 (see Figure 4) in its surface and a key member 33 secured in a transverse slot through the side of the auxiliary plunger 29 projects thereinto and allows axial movement of the main plunger 31 relative to the auxiliary plunger 29 within the limits of the notch 32 without allowing it to become disengaged therefrom. A coil spring 34 is provided in the opening 30 back of the main plunger 31 to exert a constant pressure on the latter to project it out of the auxiliary plunger 29. An opening or recess 35 is provided in the steering post 19 in the plane of the plunger 31 for receiving the end of the main plunger 31 when the post 19 is rotated to bring it in matching relation therewith and the lock is in locked position. A light coil spring 42 received within the opening 25 between the auxiliary plunger 29 and the collar 27 serves to hold the collar 27 in operative relation with the jacket 18 and also to exert a lifting tendency on the auxiliary plunger 29.

In order to cause axial movement of the plungers 29 and 31 a smaller boss 36 is formed at the end of the boss 24 and projects transversely to one side thereof, a lock cylinder 37 being received therein operable by a key 38. The stem 39 of the lock cylinder 37 extends perpendicularly through the auxiliary plunger 29, a transverse slot 40 being provided therein for the passage of the same. For ease of manufacturing, the axial opening 30 in the auxiliary plunger 29 is shown drilled into the slot 40, it being closed by a plug 34' against which the spring 34 bears. An eccentric cam 41 is formed on the stem 39 within and closely received by slot 40 so that when the key 38 is turned, thereby turning the stem 39 and cam 41, the auxiliary plunger 29 is moved up or down according to the direction of rotation of the cam 41 and position of the plunger 29. When the lock is in unlocked position, the bulk of the cam 41 lies on the side of the stem 39 remote from the post 19, that is, in a position to hold the plungers 29 and 31 away from the steering post 19 as shown in Figures 3, 4 and 5. When it is desired to place the lock in locked position, the key 38 is turned to rotate the cam 41 and force the plungers 29 and 31 down. When this is done, if the opening 35 in the steering post 19 is not in matching relation with the lower end of the plunger 31, the latter's downward movement will be stopped when it strikes the wall of the post 19. The upper plunger 29, however, will continue its downward movement, compressing the spring 34 until the parts are in the position illustrated in Figure 6. Should the steering post 19 now be rotated to bring the opening 35 into matching relation with the plunger 31 as shown in Figure 7, the spring 34 will project the plunger 31 into the opening 35 and further rotation of the steering post 19 will be impossible. The purpose of employing the two plungers 29 and 31 is to allow the mechanism to be locked in the position shown in Figure 6 without bringing the opening 35 into matching relation with the lower plunger 31; this, in effect locking the vehicle as completely as though the plunger had dropped into the opening 35 for the reason that any attempt to steer the vehicle will bring these parts into matching relation whereupon they will assume the locked position shown in Figure 7. The plungers 29 and 31 may be made integral thereby eliminating the spring 34, but if this is done it will always be necessary to bring the opening 33 and plunger 31 into matching relation before it will be possible to lock the car, and will not be as convenient for the operator of the vehicle as the construction shown.

In addition to locking the steering column against rotation, means are provided in the lock for breaking the ignition circuit, this means comprising a switch operable by the same key 38 that controls the cam 41. This is accomplished by forming a sleeve or housing 43 on the opposite side of the boss 24 from the boss 36 and extending the stem 39 thereinto, the outer end of the stem 39 being flattened to slidably but non-rotatably receive the rotating switch element 44, composed of a preferably hard insulating material, and which lies within the sleeve 43. The element 44 is provided with a contact member 45 secured thereto and which is provided with two diametrically opposed rearwardly extending arms 46 terminating in outwardly turned ball feet. A cap 47 provided with two binding posts 48, the inner ends of which are exposed on the inner face of the cap 47 and in matching relation with the inner ends of the arms 46, closes the open end of the sleeve 43. A coil spring 49, compressed between the inner end wall of the sleeve 43 and the back face of the element 44, exerts a constant pressure on the arms 46 against the inner face of the cap 47. The ball feet on the ends of the arms 46 are so positioned that when the cam 41 has been turned to its extreme limit in unlocked position, they are in contact with the binding posts 48 whereby an electric current may enter one binding post 48 and pass through the contact member 45 by way of the feet 46 and leave by the way of the other binding post. In order to prevent the cam 41 and element 44 from inadvertently turning out of this fully unlocked and circuit closed position as indicated in Figure 10, a notch 50 is formed in the periphery of the element 44 and a spring pressed plunger 51 slidably received in the hollow nut 52 threaded into the wall of the sleeve 43 in a direction radial to the element 44 is provided to resiliently engage the notch 50.

If it is desired to break the ignition without locking the steering post 19, the key 38 may be rotated towards locked position sufficiently to disengage the ball feet of the arms 46, which for convenience are also designated by the numeral 46 in Figures 10, 11 and 12, from the heads of the binding posts 48 as shown in Figure 11. A notch 53 similar to the notch 50 is provided in the periphery of the element 44, to engage the plunger 51 and hold the parts against inadvertent movement from this position. This small degree of rotation with the cam 41 in its extreme upward position is insufficient to cause any material axial movement of the plungers 29 and 31 and therefore does not cause the plunger 31 to engage the post 19.

A third notch 54, similar to the notches 50 and 53 is provided in the element 44 to hold the cam 41 and element 44 in fully locked and broken circuit position as indicated in Figure 12. It is preferable that the key 38 is removable only in this latter position, thus embodying in the lock all the advantages of the so-called "coincidental" locks without incorporating the disadvantages thereof.

The operation of the lock is of course obvious from the above description. The key 38 is the sole controlling means and as shown, when the lock is in locked position and it is desired to place it in unlocked position, the key is inserted and turned in a clockwise direction until the plunger 51 engages the notch 50 at which time the cam 41 has raised the plunger 31 out of engagement with the post 19 and has brought the switch arms 46 into contact with the binding posts 48, thus closing the ignition circuit. If, now, it is desired to break the ignition circuit without locking the steering post 19, the key 38 is turned in an anti-clockwise direction sufficiently to bring the notch 53 into engagement with the plunger 51, and if it is desired to fully lock the vehicle the key 38 is further turned in an anti-clockwise direction until the notch 54 engages the plunger 51 at which time not only is the ignition circuit broken but the plunger 31 is in engagement with the post 19 in either the manner illustrated in Figure 6 or in Figure 7, in which position only it is preferable that the key 38 is removable from the lock barrel 37.

Formal changes may be made in the specific embodiment of the invention described without departing from the spirit and substance of the broad invention, the scope of which is commensurate with the appended claims.

What I claim is:—

1. In combination with the steering post and jacket of a motor vehicle, a casing surrounding said jacket provided with an opening radial thereto, a plunger mechanism having a slot extending transversely therethrough axially movable in said opening, a recess in sa'd post for engagement with said plunger mechanism, an eccentric cam positioned within said slot and rotatable by key controlled means to control the axial position of said plunger mechanism, and a rotatable electric switch member directly operable by said key controlled means and rotatable simultaneously with said cam.

2. In combination a slidably movable locking bolt, an electric circuit including a rotatable make and break mechanism, means for withdrawing said bolt and for closing said circuit, and a spring pressed detent for holding said means in three positions, the first with the bolt in locking position with the circuit open, the second with the bolt withdrawn and the circuit open and the third with the bolt withdrawn and the circuit closed.

3. In a coincidental lock, a slidably movable, locking member, an ignition circuit make and break mechanism, key-operated rotary means for moving the locking member from locking position prior to the closing of the ignition circuit, and a spring pressed detent for holding said locking member in "off" position and said make and break mechanism in "open" position.

4. In a coincidental lock, a locking member, an ignition circuit make and break mechanism, key-operated means for moving said locking member to locked position and said make and break mechanism to open position, said means also moving said locking member to unlocked position and retaining said make and break mechanism in open position, and said means also retaining said locking member in unlocked position and moving said make and break mechanism to closed position, and means for holding said locking member and said make and break mechanism in the aforesaid positions.

5. In a coincidental lock, a locking member, an ignition circuit make and break mechanism, key-operated rotary means for moving said locking member to locking position, said means being operable for moving said locking member to unlocked position without closing the ignition circuit, and for closing the ignition circuit upon further movement thereof, and means for holding said means in the second named position.

6. In a coincidental lock, a slidably movable steering post locking bolt, an ignition circuit make and break mechanism, key-operated rotary means for moving said locking member to locking position, said means being operable for moving said locking member to unlocked position without closing the ignition circuit and for closing the ignition circuit upon further movement thereof, and automatically movable means for holding said means in the second named position.

7. In a coincidental lock, a locking member, an ignition circuit make and break mechanism, rotary means comprising a key-operated tumbler lock having a stem extending therefrom provided with a cam for moving said locking member to locking position, said means being operable for moving said locking member to unlocked position without closing the ignition circuit, and for closing the ignition circuit upon further movement thereof, and means for holding said means in the second named position.

Signed by me at Detroit, Michigan, U. S. A., this 8th day of September 1925.

ERNEST P. LAMB.